United States Patent [19]

Takeda et al.

[11] 4,275,692
[45] Jun. 30, 1981

[54] SYSTEM FOR CONTROLLING IGNITION TIMINGS IN ENGINE

[75] Inventors: Yuji Takeda; Takashi Shigematsu; Daisaku Sawada, all of Shizuoka, Japan

[73] Assignee: Toyota Jidosha Kogyo Kabushiki Kaisha, Toyota, Japan

[21] Appl. No.: 65,756

[22] Filed: Aug. 10, 1979

[30] Foreign Application Priority Data

Aug. 15, 1978 [JP] Japan .................... 53-99669

[51] Int. Cl.³ .............................. F02P 5/14
[52] U.S. Cl. ...................... 123/419; 123/425
[58] Field of Search .......... 123/117 R, 117 D, 148 E, 123/146.5 A, 148 C, 119 A, 32 EE, 119 ED, 32 EK; 73/35

[56] References Cited

U.S. PATENT DOCUMENTS

| 3,660,689 | 5/1972 | Oishi et al. | 123/117 R |
|---|---|---|---|
| 3,885,720 | 5/1975 | Brennan | 123/117 R |
| 3,903,856 | 9/1975 | McDougal et al. | 123/117 R |
| 4,002,155 | 1/1977 | Harned et al. | 123/148 E |
| 4,012,942 | 3/1977 | Harned | 123/117 R |
| 4,063,538 | 12/1977 | Powell et al. | 123/117 R |
| 4,106,447 | 8/1978 | West | 123/117 R |
| 4,120,272 | 10/1978 | Douaud et al. | 123/117 D |
| 4,131,097 | 12/1978 | Savanda et al. | 123/117 R |
| 4,153,020 | 5/1979 | King et al. | 123/117 R |
| 4,175,508 | 11/1979 | Wesenmeyer et al. | 123/117 R |

Primary Examiner—Charles J. Myhre
Assistant Examiner—R. A. Nelli
Attorney, Agent, or Firm—Cushman, Darby & Cushman

[57] ABSTRACT

A system for controlling ignition timings in an engine wherein ignition signals in the specific cylinders are previously advanced by a predetermined value over ignition signals in other cylinders, the knockings in the specific cylinders are detected, and ignition timings in all the cylinders are delayed in accordance with said knockings, whereby strong knockings which would otherwise be caused to all the cylinders are prevented in advance, the ignition timing control of knockings in the engine can be effected irrespective of the accuracies of a knocking sensor.

13 Claims, 7 Drawing Figures

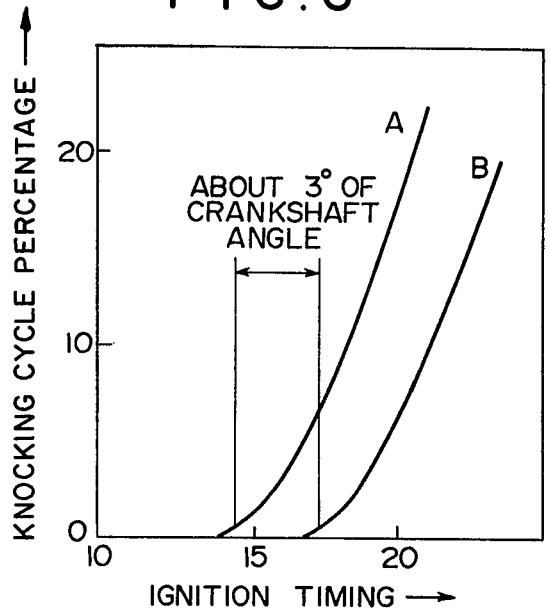
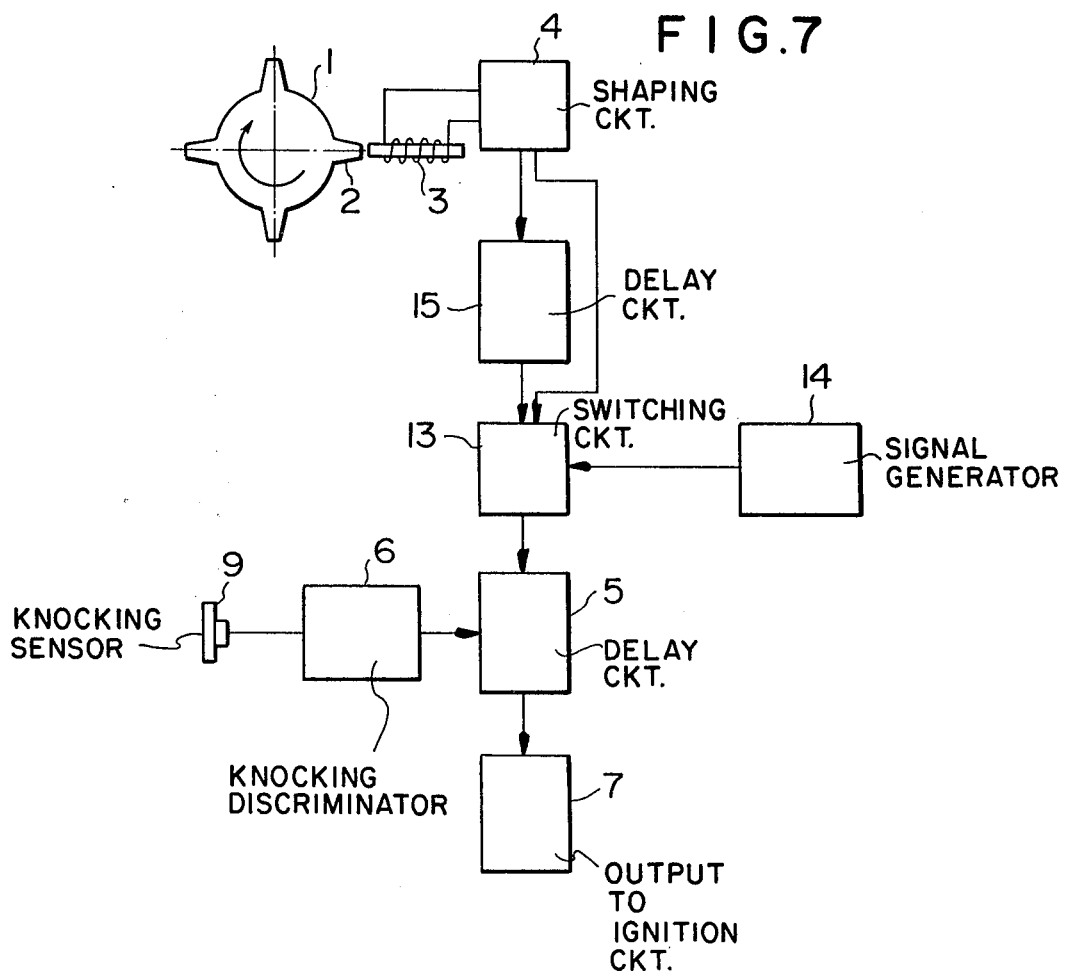

SYSTEM FOR CONTROLLING IGNITION TIMINGS IN ENGINE

BACKGROUND OF THE INVENTION

1. Field of the Invention

The present invention relates to a system for controlling ignition timing in an engine, wherein feedback control is effected such that ignition timing is delayed when knocking is detected and timing is advanced when no knocking is detected.

2. Description of the Prior Art

Knocking in an engine is a dangerous phenomenon which may cause melting loss to pistons and exhaust valves and which leads to destruction of the engine in extreme cases. In the conventional systems for controlling ignition timing in engines, to avoid the occurrence of serious trouble due to knocking, ignition timing is retarded from the ignition timing where knocking may occur by a predetermined amount.

Description will hereunder be given to the relationship between the probability of knocking and the ignition timing control level with reference to the graph of the knocking cycle percentage as shown in FIG. 1. In FIG. 1, the percentage of engine cycles in which knocking occurs is given as an abscissa and the ignition timing as an ordinate. In the drawing, if the ignition timing is advanced, a strong knocking condition takes place, with the result that, for example, at the point C, the percentage of engine cycles in which knocking is detected is increased as at the point A. It is possible to reduce the knocking cycle percentage from the point A. to the point B by retarding the spark from the point C to the Point D.

However, there have been the following disadvantages with the conventional ignition system for controlling the frequency of the occurrence of knocking.

(1) A detector for detecting the occurrence of knocking has its limit in sensitivity, with the result that, even in the case the knocking condition occurs in reality, if the condition does not reach the extent which can be detected by the detector, it has been impossible to control the frequency of knocking.

(2) There have been such cases that the detectors for detecting the occurrence of knocking can sensitively detect the occurrence of knocking in cylinders adjacent to the mounting positions of the detectors, but the detectors cannot detect the occurrence of knocking in cylinders remote from the mounting positions of the detectors because of low sensitivity of the detectors. Consequently, in the case it is designed that the ignition timings of all the cylinders are made equal, if the knocking condition tends to easily occur in a specific cylinder due to a lack of fuel distribution, different conditions of deposits in combustion chambers or the like, the detector may not detect the knocking condition in said specific cylinder which would be located remote from the detector, with the result that such cases have occurred where the control of ignition timing is not effected even if the frequency of the occurrence of knocking becomes high.

SUMMARY OF THE INVENTION

One object of the present invention is, to obviate the above-described disadvantages by temporarily feeding the ignition signal advanced over the ordinary ignition timing to an ignition system to operate a knocking detector, so that the frequency of the occurrence of knocking can be controlled to a level of a very small value.

The system for controlling ignition timing according to the present invention, in a multi-cylinder internal combustion engine, comprises an ignition signal generator for generating an ignition signal set at a predetermined ignition timing depending upon the conditions of the engine, a detector for detecting the occurrence of knocking, and a control device for delaying ignition timing set by said ignition signal generator in accordance with an output signal from said detector, so that ignition timing can be controlled to reduce the frequency of the occurrence of knocking to a certain value, characterized in that an auxiliary ignition signal generator is provided which operates at a timing which is advanced by a predetermined value as compared to the ignition signal generator and which generates an auxiliary ignition signal which is selectively substituted for the signal from the ignition signal generator.

BRIEF EXPLANATION OF THE DRAWINGS

FIG. 6 is a graph showing the ignition timings of a cylinder in which the knocking condition easily occurs and of another cylinder in which the knocking condition unlikely occurs; and FIG. 7 is a circuit diagram of one embodiment of the ignition timing control device using a delay circuit according to the present invention.

DETAILED DESCRIPTION OF THE INVENTION

Detailed description will hereunder be given of embodiments of the present invention.

Figure 1:
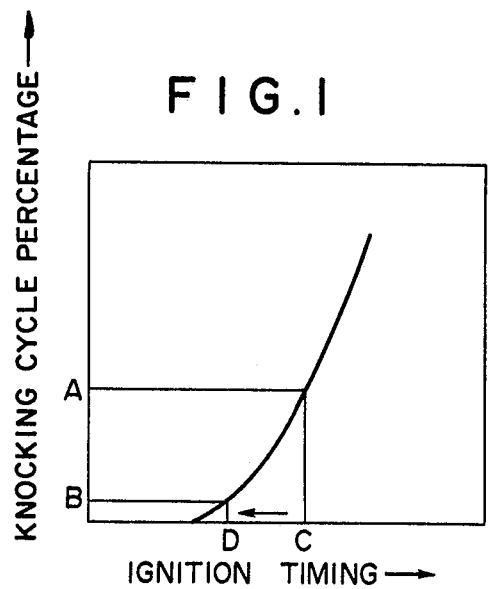
FIG. 1 is a graph showing the relationship between the percentage of engine cycles in which knocking occurs and ignition timing in the engine.
Figure 2:
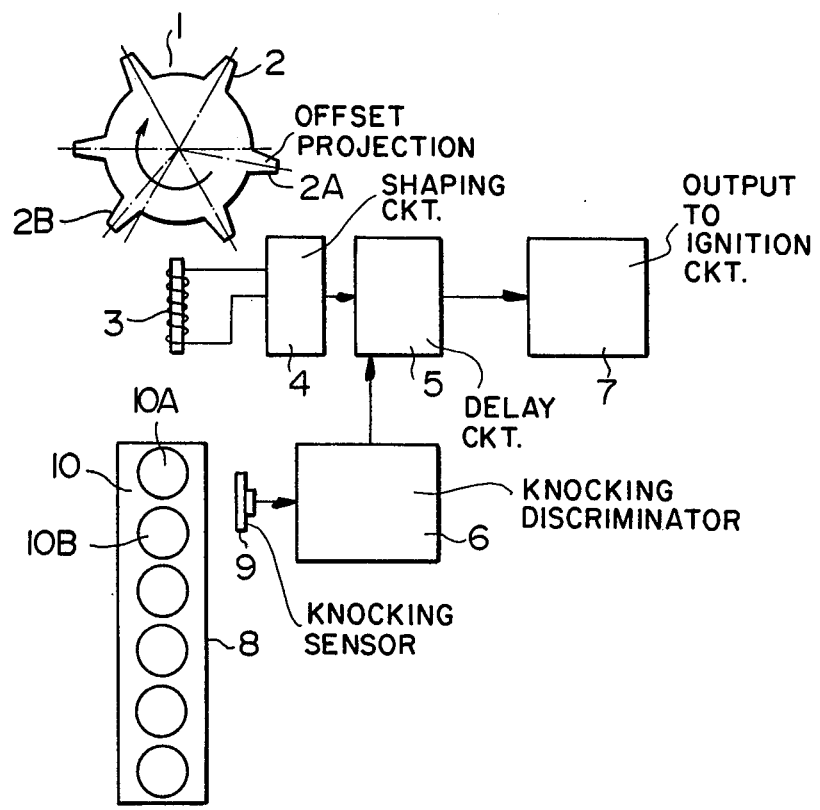
FIG. 2 is a circuit diagram of one embodiment of the ignition timing control device according to the present invention.

FIG. 2 shows one embodiment of the ignition timing control device of an engine according to the present invention.

In the drawing, a pulse rotor 1 formed at the marginal portion thereof with projections 2 corresponding in number to the cylinders of the engine rotates, as well known, in synchronism with the rotation of crankshaft of the engine 8 at half the number of revolutions of crankshaft in a four-cycle engine, and is mounted in a manner such that it is advanceable by a centrifugal advance mechanism, a vacuum advance mechanism or the like. The drawing shows a pulse rotor 1 for use in a six-cylinder engine in which projections 2A and 2B are advanced over other projections. Said projections 2A, 2B and an ignition signal generator to be described hereinafter constitute an auxiliary ignition signal generator. A pickup 3 for generating and ignition pulse is provided aligned with pulse rotor 1, and a waveform shaping circuit 4 for producing sharp pulses from said ignition pulse outputted by said pickup 3 is connected to said pickup 3. It is arranged such that the output of shaping circuit 4 is fed to a delay control circuit 5 connected to shaping circuit 4. Delay control circuit 5 converts the ignition pulse fed from the shaping circuit 4 into an ignition pulse delayed by a value in proportion to an output fed from a knocking discriminating circuit 6. Connected to delay control circuit 5 is an output circuit 7 for sending out the delay pulse fed from delay control circuit 5 to an ignition system. The abovedescribed pulse rotor 1, pickup 3, shaping circuit 4 and output circuit 7 constitute an ignition signal generator for generating an ignition signal set at a predetermined ignition timing depending upon the conditions of the engine. The engine 8 comprises six cylinders 10. In the drawing, cylinders 10A and 10B correspond to the projections 2A and 2B of the pulse rotor 1, respectively, said cylinders 10A and 10B being advanced in ignition timing over other cylinders by a predetermined value, e.g., three degrees in the crankshaft angle. A knocking sensor 9 is provided at a position where good sensitivity is obtainable for the knockings occurring in the cylinders 10A and 10B of said engine 8. Said knocking sensor 9 is one for detecting vibrations of the main body of engine 8 or sound waves caused due to said vibrations and converting same into an electric signal, for example. Connected to said knocking sensor 9 is a knocking discriminating circuit 6 for detecting the occurrence of knocking based on an output signal fed from the knocking sensor 9. Said knocking discriminating circuit 6 is arranged such that, when an output signal fed from the knocking sensor 9 exceeds a predetermined value, said signal is detected as a knocking signal and said detected pulse is fed to the delay control circuit 5. The knocking discriminating circuit 6 and the delay control circuit 5 constitute the control device.

As will be perfectly obvious to those of ordinary skill in the art, the foregoing description of rotor 1, projections 2, pickup 3, shaping circuit 4, delay circuit 5, knocking sensor 9, knock discriminator 6 and output circuit 7 simply describes any of the numerous, well known, knock-responsive ignition control systems, such as, merely for example, the system described in U.S. Pat. No. 4,106,447 to West.

In said ignition timing control device, rotation of a crankshaft of the engine 8 causes the pulse rotor 1 to rotate in synchronism with the crankshaft of the engine 8, and the pickup 3 sends out an ignition pulse every time the projection 2 of the pulse rotor 1 passes through pickup 3. The ignition pulse sent out from the pickup 3 is converted into a rectangular wave in the shaping circuit 4. On the other hand, the signal detected at the knocking sensor 9 is fed to the knocking discriminating circuit 6 which in turn feeds a pulse per every ignition cycle in which a knocking is detected to the delay control circuit 5. In the case no knocking is detected in the cylinders 10 of the engine 8, delay control circuit 5 does not operate, the signal fed from the pickup 3 is directly fed to the output circuit 7 as an ignition timing, whereby the ignition timing is determined. Furthermore, when the engine 8 falls into a condition where knockings easily occur, knockings occur in the cylinders 10A and 10B of the engine 8 because the cylinders 10A and 10B are advanced over other cylinders. Said knockings are detected by the knocking sensor 9, the knocking discriminating circuit 6 feeds a signal corresponding to the frequency of the occurrence of knocking to the delay control circuit 5 to actuate same. Upon receipt of a signal from the knocking discriminating circuit 6, the delay control circuit 5 delays the ignition pulse fed from the shaping circuit 4 by a certain period of time or a period of time corresponding to a certain degrees of crankshaft angle in accordance with the output signal fed from the knocking discriminating circuit 6, i.e., in accordance with the frequency of knockings discriminated. The ignition pulse thus delayed is fed to the output circuit 7 to actuate the ignition system.

Consequently, in this embodiment specific cylinders have ignition timings advanced by a predetermined value over other cylinders and all the knockings caused to the cylinders can be detected, so that the frequency of the occurrence of knocking can be more correctly determined, thereby improving the accuracy of the ignition timings. Furthermore, in the present embodiment, ignition timings of the specific cylinders are advanced and ignition timings of all the cylinders are controlled based on the occurrence of knockings in the specific cylinders in which ignition timings are advanced, so that the ignition timings can be controlled before knockings are caused to all the cylinders, thus enabling to control the frequency of the occurrence of knocking to a level significantly lower than that in the conventional engines.

Furthermore, in this embodiment, for example, if detection of one knocking cycle delays ignition timing by one degree and eight consecutive ignition signals without knocking advance ignition timing by one degree, it follows from the foregoing that the ignition timing after said control varies to the delay side when the rate of knocking cycle is more than one eighth and the ignition timing after the control varies to the advance side when the rate of knocking cycle is less than one eighth. Consequently, if the average is taken of many cycles in said control, then it follows that such an ignition timing is selected that the rate of knocking cycle is controlled to one eighth. Now, if the rate of advance or delay control as described above is varied from one eighth to one sixteenth, then the rate of knocking cycle is controlled to one sixteenth, with the result that control can be effected to the level of the weaker conditions of the occurrence of knocking.

Figure 3:
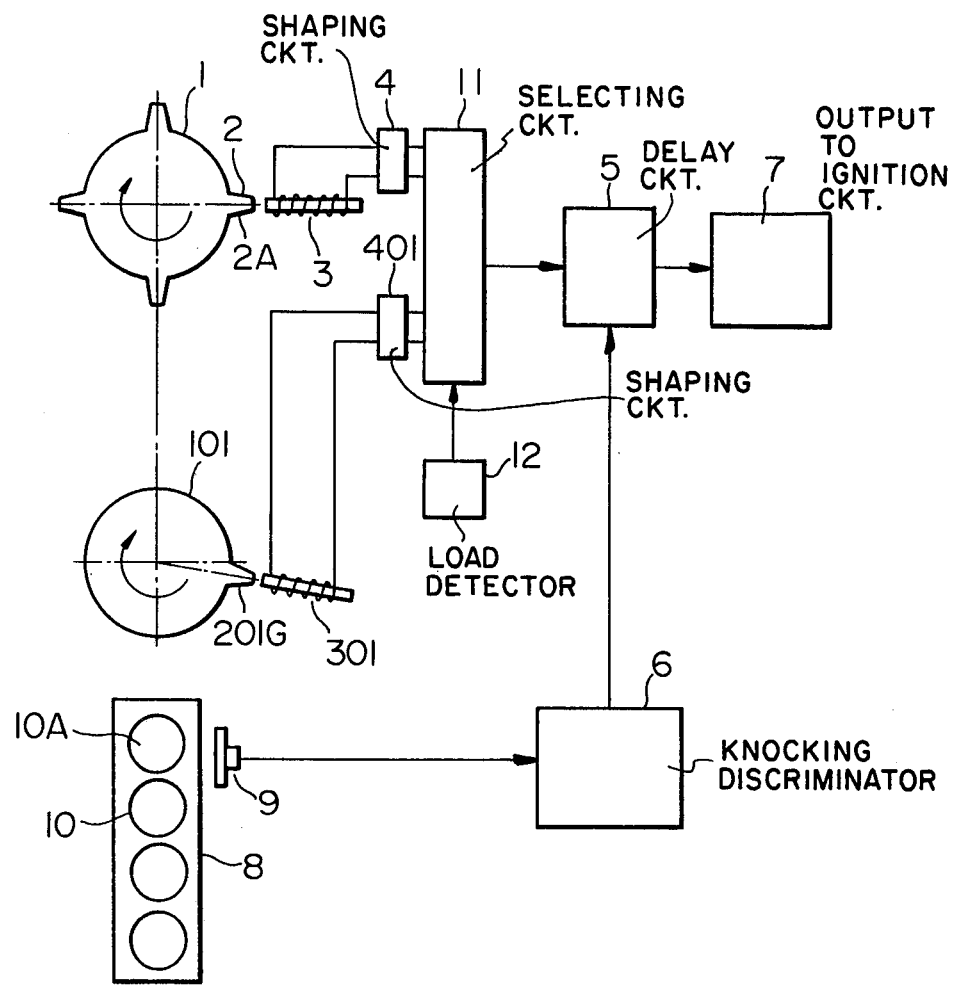
FIG. 3 is a circuit diagram of one embodiment of the ignition timing control device using two pulse rotors according to the present invention.
Figure 4:
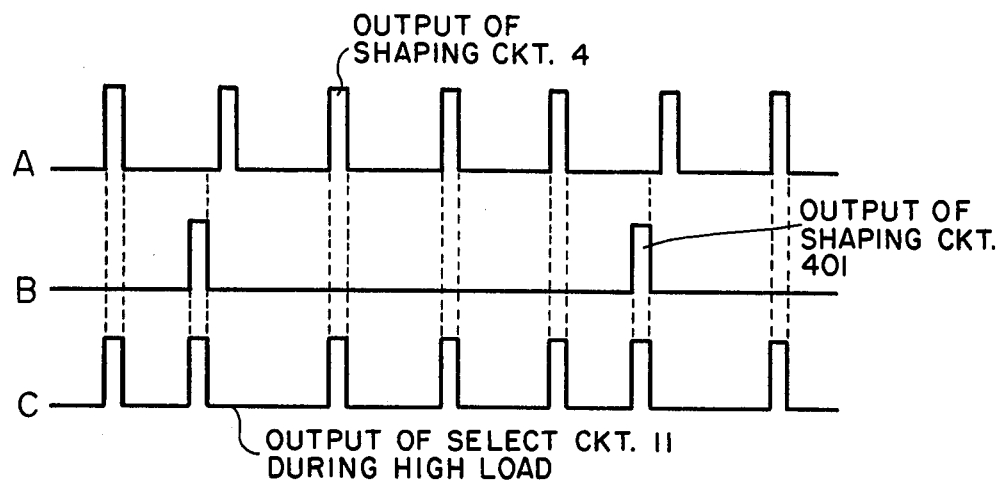
FIG. 4 is an illustration of rectangular waves of ignition pulses fed from two pulse rotors.

FIG. 3 shows another embodiment. In this embodiment, in addition to the pulse rotor 1, another pulse rotor 101 is mounted which rotates in unison with the pulse rotor 1 and in synchronism with the rotation of crankshaft of the engine 8, and has a projection 201G advanced by a predetermined value, e.g., three degrees of crankshaft angle over desired projection 2a of the pulse rotor 1. The knocking sensor 9 is secured to the cylinder 10A corresponding to the projection 201G thus advanced. An ignition pulse of the pulse rotor 1 is fed by the pickup 3 to the shaping circuit 4, and an ignition pulse of the pulse rotor 101 is fed by the pickup 301 to a waveform shaping circuit 401. The shaping circuits 4 and 401 are connected to a selecting circuit 11. Connected to said selecting circuit 11 is an engine load detector 12, which detects the high load condition of the engine through suction negative pressure. Here, the pulse rotor 101, pickup 301, shaping circuit 401, selecting circuit 11, engine load detector 12 and output circuit 7 constitute an auxiliary ignition timing generator. While receiving no signal input from the engine load detector 12, the selecting circuit 11 feeds an ignition pulse signal of the pulse rotor 1 which has been fed from the shaping circuit 4 as shown in FIG. 4A to the delay control circuit 5. While receiving signal inputs from the engine load detector 12, the selecting circuit 11 compounds an ignition pulse signal of the pulse rotor 1 fed from the shaping circuit 4 as shown in FIG. 4A with an ignition pulse signal of the pulse rotor 101 fed from the shaping circuit 401 as shown in FIG. 4B, and feeds a composite signal as shown in FIG. 4C, in which a signal pulse of the projection 2A of the pulse rotor 1 corresponding to the projection 201G of the pulse rotor 101 is cancelled, to the delay control circuit 5. Other points are the same as in the embodiment shown in FIG. 2.

In the present embodiment, the ignition timings of all the cylinders are made equal to one another in the condition where it is apparent that the knocking does not occur, and hence, the influence of the difference in ignition timing among the cylinders can be minimized in the condition where the knocking does not occur as in the embodiment of FIG. 2 in which ignition timings of the specific cylinders are previously advanced. Additionally, the selecting circuit 11 is arranged such that a signal from the shaping circuit 401 is fed to said selecting circuit 11 in accordance with the signal from the engine load detector 12 when the engine load is high. As an alternative measure, a signal from the shaping circuit 401 can be fed to said selecting circuit 11 periodically in every predetermined period of time, or an accelerator pedal is depressed more than a predetermined value.

Figure 5:
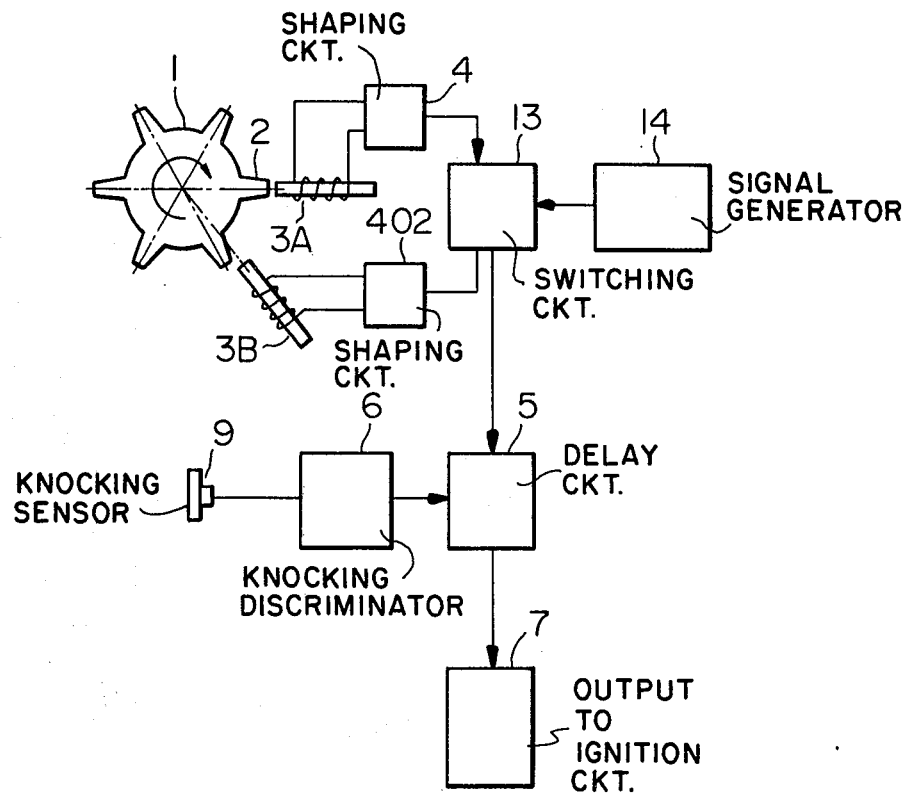
FIG. 5 is a circuit diagram of one embodiment of the ignition timing control device using two pickups which are set at phases different from each other according to the present invention.

FIG. 5 shows a further embodiment.

In the drawing, pickups 3A and 3B are set at phases different from each other for taking out ignition pulses of the pulse rotor 1 equidistantly provided at the marginal portion thereof with projections 2 corresponding in number to the cylinders in the engine.

In a multi-cylinder engine, the tendency of easily causing the knocking is different from cylinder to cylinder due to a lack of uniformity in fuel distribution, different condition of deposits in combustion chambers or the like. More particularly, when the ignition timing is given as an abscissa and the knocking cycle percentage in which the conditions of the occurrence of knocking in the specific cylinders are judged as the knockings is given as an ordinate, there is a difference in ignition timing of more than three degrees of crankshaft angle between a cylinder A in which knocking tends to occur most easily and a cylinder B in which knocking tends to occur most rarely as shown in FIG. 6. Consequently, two pickups 3A and 3B are set at crankshaft angles different from each other at least by three degrees or more than that.

The pickup 3A is connected to the shaping circuit 4, and the pickup 3B to the shaping circuit 402, respectively. The pulses shaped in shaping circuits 4 and 402 and sent out therefrom are fed to a switching circuit 13. Connected to said switching circuit 13 is a periodical signal generating circuit 14 for generating signals at a certain cycle and sending out same. Said switching circuit 13 is arranged such that it normally receives ignition pulses fed from the shaping circuit 4 and feeds same to the delay control circuit 5 connected to said switching circuit 13, but, while receiving signal inputs from the periodical signal generating circuit 14, it feeds ignition pulses received from the shaping circuit 402 to the delay control circuit 5. Here, the pulse rotor 1, pickup 3B, shaping circuit 402, switching circuit 13, periodical signal generating circuit 14 and output circuit 7 constitute an auxiliary ignition signal generator. The periodical signal generating circuit 14 is arranged such that, upon receiving a signal from a load detecting signal generator, not shown, indicative of a high load, it periodically emits signals. Furthermore, similarly to the selecting circuit 11 in the embodiment shown in FIG. 3, various arrangements are applicable to the periodical signal generating circuit 14. Others points are the same as in the embodiment shown in FIG. 2.

In the present embodiment, when the periodical signal generating circuit 14 operates to feed a signal to the switching circuit 13, said output signal causes the switching circuit 13 to feed to the delay control circuit 5 an ignition pulse fed from the shaping circuit 402 instead of an ignition pulse fed from the waveshape shaping circuit 4.

Consequently, in the present embodiment, a few cycles in which knocking tends to occur easily and many cycles in which knocking occurs most unlikely are provided, whereby detection of knockings occurring in a few cycles in which knocking tends to occur easily makes it possible to control ignition timings, so that correct control can be effected under the condition that the frequency of the occurrence of knocking is low on the whole.

FIG. 7 shows a still further embodiment.

The difference of this embodiment from the embodiment shown in FIG. 5 resides in that the pickup 3B provided on the pulse rotor 1 and the waveshape shaping circuit 402 connected to the pickup 3B are removed, and another circuit including a delay circuit 15 is provided between the shaping circuit 4 connected to the pickup 3 and the switching circuit 13. Said delay circuit 15 delays the ignition pulse fed from the waveshape shaping circuit 4 by a predetermined period of time or a period of time corresponding to predetermined degrees of crankshaft angle and feeds same to the switching circuit 13. It is suitable to select the value of delay of said delay circuit 15 to correspond to the difference in ignition timing between the cylinder in which knocking tends to occur most easily and the cylinder in which knocking occurs most unlikely, i.e., at least three degrees of crankshaft angle or more than that. In accordance with the above, the pulse rotor 1 is advanced in setting angle by said degrees of crankshaft angle to offset the value of delay made by the delay circuit 15. The arrangement as described above is one having the function similar to the portion arranged such that, as shown in the embodiment illustrated in FIG. 5, to obtain ignition pulses different in phase from each other, two pickups 3A and 3B are used, so that an ignition pulse advanced by a mechanical method may be obtained by use of one pickup 3B and a normal ignition pulse may be obtained by use of the other pickup 3A. Namely, in the embodiment shown in FIG. 7, it is previously arranged such that an ignition pulse advanced over the normal position can be generated by use of one pickup, said ignition pulse advanced over the normal position is electrically delayed to obtain a normal ignition pulse, with the result that two ignition pulses can be obtained which include said ignition pulse advanced over the normal position and the normal ignition pulse electrically delayed. Namely, the pulse rotor 1, pickup 3, shaping circuit 4, delay circuit 15, switching circuit 13 and output circuit 7 constitute an ignition signal generator, and the pulse rotor 1, pickup 3, shaping circuit 4, switching circuit 13, periodical signal generating circuit 14 and output circuit 7 constitute an auxiliary ignition signal generator. While receiving no input signals fed from the periodical signal generating circuit 14, the switching circuit 13 feeds the output signals fed from the delay circuit 15 to the delay control circuit 5, but, while receiving input signals fed from the periodical signal generating circuit 14, said switching circuit 13 feeds the ignition pulses fed from the shaping circuit 4 to the delay control circuit 5. Other points are the same as in the embodiment shown in FIG. 5.

Consequently, the same advantages as in the embodiment shown in FIG. 5 can be offered by the present embodiment.

As has been described so far, according to the present invention, the condition in which knocking tends to occur easily is created by temporarily advancing ignition timing, whereby ignition control is effected under said condition, so that the frequency of the occurrence of knocking can be controlled to the level of a very small value on the whole.

Furthermore, the present invention has more various modifications other than the embodiments as described above. For example, as the auxiliary ignition signal generator, there may be used one in which an advance by a predetermined value is attained by the negative pressure advancing mechanism known in the art.

It is needless to say that the value of advance in ignition timing by the auxiliary ignition signal generator may be selected as necessary to meet the requirement.

What is claimed is:

1. An ignition timing control system for an engine having a plurality of cylinders comprising:
    first means for generating first ignition signals in synchronism with the rotation of the engine;
    second means for generating second ignition signals advanced by a predetermined value with respect to at least some of said first ignition signals;
    means, responsive to said first and second ignition signals, for applying said first signals and for selectively applying said second signals, instead of said first signals;
    means for detecting knocking; and
    means for altering the timing of said first ignition signals, and therefore said second ignition signals, in response to said detecting means.

2. An ignition timing control system for an engine having a plurality of cylinders comprising:
    means for generating ignition signals in synchronism with the rotation of said engine, selected ones of said signals being advanced with respect to the remainder of said signals by a predetermined amount, each of said selected signals corresponding to the ignition signals for a particular one of said cylinders;
    means for knock detection disposed adjacent said particular one of said cylinders; and
    means for altering the timing of said ignition signals in response to said detecting means.

3. Apparatus as in claim 2 wherein said generating means comprises:
    a rotor having a plurality of equi-spaced indices, except that at least one of said indices is offset with respect to the other of said indices by a predetermined amount in a first direction;
    means for rotating said rotor in said first direction at a speed related to said engine speed; and
    means for sensing the passage of said indices and generating said ignition signals in response thereto.

4. An ignition timing control system for an engine having a plurality of cylinders comprising:
    first means for generating first ignition signals in synchronism with the rotation of the engine;
    second means for generating second ignition signals advanced by a predetermined value with respect to at least some of said first ignition signals;
    load detecting means for generating a load signal when the load on said engine exceeds a predetermined amount;
    means, responsive to said first and second ignition signals and to said load detecting means, for applying said first signals in response to the absence of said load signal and for applying said second signals and those of said first signals not corresponding to said second signals in response to said load signal;
    means for detecting knocking; and
    means for altering the timing of said first and second ignition signals in response to said detecting means.

5. Apparatus as in claim 4 wherein: said first means comprises:
    a first rotor having a plurality of equi-spaced indices,
    means for rotating said first rotor at a speed related to said engine speed, and
    first means for sensing the passage of said first indices and generating said first ignition signals in response thereto; and said second means comprises:
    a second rotor having at least one second index,
    means for rotating said second rotor at the same speed as said first rotor, and
    second means for sensing the passage of said at least one second index and generating said second ignition signals related thereto, said at least one second index passing said second sensing means a predetermined amount before a corresponding one of said first indices passes said first sensing means.

6. An ignition timing control system for an engine having a plurality of cylinders comprising:
    first means for generating first ignition signals in synchronism with the rotation of the engine;
    second means for generating second ignition signals advanced by a predetermined value with respect to at least some of said first ignition signals;
    means for detecting the load on said engine;
    means for producing periodic signals when said detecting means indicates said engine has a high load;
    means, responsive to said first and second ignition signals and said producing means, for applying said first signals in response to the absence of said periodic signals and for applying said second signals and those of said first signals not corresponding to said second signals in response to said periodic signals;
    means for detecting knocking; and
    means for altering the timing of said first ignition and second ignition signals in response to said detecting means.

7. Apparatus as in claim 6 wherein said first and second generating means comprises:
    a rotor having a plurality of equi-spaced indices;
    means for rotating said rotor in a first direction at a speed related to said engine speed;
    first means for sensing the passage of said indices past a first point and generating said first ignition signals in response thereto; and
    second means for sensing the passage of said indices past a second point and generating said second ignition signals in response thereto, said indices passing said second point a predetermined amount before corresponding said indices pass said first point.

8. An ignition timing control system for an engine having a plurality of cylinders comprising:
- means for generating ignition signals in synchronism with the rotation of the engine;
- means for delaying said ignition signals;
- means for detecting the load on said engine;
- means for producing periodic signals when said detecting means indicates said engine has a high load;
- means, responsive to said ignition signals said delayed ignition signals and said producing means, for applying said delayed ignition signals in response to the absence of said periodic signals and for applying said ignition signals in response to said periodic signal;
- means for detecting knocking; and
- means for altering the timing of said ignition signals, and therefore said delayed ignition signals, in response to said detecting means.

9. Apparatus as in claim 8 wherein said generating means comprises:
- a rotor having a plurality of equi-spaced indices;
- means for rotating said rotor at a speed related to said engine speed; and
- means for sensing the passage of said indices and generating said ignition signals in response thereto.

10. An ignition timing control system as set forth in claim 8, wherein said delaying means is adapted to generate said delayed ignition signals in every predetermined period of time after each of said ignition signals.

11. An ignition timing control system as set forth in claim 1, 4 or 6, wherein said second generating means generates said second ignition signals at every predetermined rotational angle of crankshaft.

12. An ignition timing control system as set forth in claim 1, 4 or 6, wherein said second means is adapted to generate an auxiliary ignition signal or signals corresponding to at least a particular one of said cylinders and said knocking detecting means is disposed adjacent to said at least a particular one of said cylinders.

13. An ignition timing control system as set forth in claim 12 wherein said at least a particular one of said cylinders is provided at a position where knocking can be easily detected with said knocking detecting means.

* * * * *